United States Patent
Wießmann et al.

(10) Patent No.: US 11,855,514 B2
(45) Date of Patent: Dec. 26, 2023

(54) STATOR OF AN ELECTRICAL MACHINE, ELECTRICAL MACHINE AND CONNECTING DEVICE

(71) Applicant: Brose Fahrzeugteile SE & Co. Kommanditgesellschaft, Würzburg, Würzburg (DE)

(72) Inventors: Nico Wießmann, Kitzingen (DE); Alexander Volkamer, Oberscheinfeld (DE); Wolfgang Strauß, Unterpleichfeld (DE)

(73) Assignee: Brose Fahrzeugteile SE & Co. Kommanditgesellschaft, Würzburg, Würzburg (DE)

( * ) Notice: Subject to any disclaimer, the term of this patent is extended or adjusted under 35 U.S.C. 154(b) by 584 days.

(21) Appl. No.: 17/053,263

(22) PCT Filed: May 3, 2019

(86) PCT No.: PCT/EP2019/061370
§ 371 (c)(1),
(2) Date: Nov. 5, 2020

(87) PCT Pub. No.: WO2019/215031
PCT Pub. Date: Nov. 14, 2019

(65) Prior Publication Data
US 2021/0288546 A1 Sep. 16, 2021

(30) Foreign Application Priority Data
May 8, 2018 (DE) ............... 10 2018 207 123.3

(51) Int. Cl.
*H02K 3/52* (2006.01)
*H02K 3/34* (2006.01)
(Continued)

(52) U.S. Cl.
CPC ............ *H02K 5/225* (2013.01); *H02K 3/34* (2013.01); *H02K 3/345* (2013.01); *H02K 3/52* (2013.01);
(Continued)

(58) Field of Classification Search
CPC .......... H02K 3/522; H02K 5/225; H02K 3/34; H02K 3/345; H02K 3/50; H02K 3/52;
(Continued)

(56) References Cited

U.S. PATENT DOCUMENTS

2012/0098380 A1* 4/2012 Wang ............... H02K 15/0442
310/260
2015/0333590 A1* 11/2015 Yoshida ............... H02K 3/522
310/71
(Continued)

FOREIGN PATENT DOCUMENTS

| DE | 102004049072 A1 | 4/2006 |
| DE | 202010016199 U1 | 2/2011 |

(Continued)

OTHER PUBLICATIONS

Goeke et al., Electric Machine, Jan. 18, 2018, DE 102016213110 (English Machine Translation) (Year: 2018).*
(Continued)

*Primary Examiner* — Alexander A Singh
(74) *Attorney, Agent, or Firm* — Dickinson Wright PLLC

(57) ABSTRACT

A stator of an electrical machine, more particularly an electric motor of a motor vehicle, comprising: a laminated stator core, which has a number of stator teeth and is provided with a rotating field winding, which is arranged on the stator teeth and comprises a plurality of phases, the phases of the rotating field winding being formed from a continuously wound winding wire; and a connecting device having a number of U-shaped sockets corresponding to the
(Continued)

number of phases, said sockets being provided for each holding one insulation displacement contact as a point of connection of the winding wire to phase terminals on a stator end face, each socket having two vertical U legs and a contact slot arranged therebetween for receiving the winding wire, one of the two vertical U legs of the socket being longer in an axial direction than the other vertical U leg in each case.

16 Claims, 7 Drawing Sheets

(51) Int. Cl.
*H02K 5/22* (2006.01)
*B60K 6/26* (2007.10)
(52) U.S. Cl.
CPC .............. *B60K 6/26* (2013.01); *B60Y 2200/91* (2013.01); *B60Y 2200/92* (2013.01); *B60Y 2400/60* (2013.01); *H02K 3/522* (2013.01)
(58) Field of Classification Search
CPC ........ H02K 3/38; H02K 3/28; B60Y 2400/60; B60Y 2200/91; B60Y 2200/92; B60K 6/26

USPC ............................................ 310/71, 214, 215
See application file for complete search history.

(56) References Cited

U.S. PATENT DOCUMENTS

| 2016/0261161 A1* | 9/2016 | Roos ....................... H02K 3/522 |
| 2017/0033635 A1 | 2/2017 | Yang et al. |
| 2017/0201143 A1* | 7/2017 | Pae .......................... H02K 5/12 |

FOREIGN PATENT DOCUMENTS

| DE | 102013114688 A1 | 6/2015 | |
| DE | 102015217017 A1 | 3/2017 | |
| DE | 102016206657 A1 | 10/2017 | |
| DE | 102016213110 A1 * | 1/2018 | ............... H02K 5/15 |
| WO | 2016124636 A1 | 8/2016 | |
| WO | WO-2019052782 A1 * | 3/2019 | ......... H02K 15/0068 |
| WO | 2019068389 A1 | 4/2019 | |

OTHER PUBLICATIONS

Koch et al., Stator for an Electrical Machine, Mar. 21, 2019, WO 2019052782 (English Machine Translation) (Year: 2019).*

* cited by examiner

STATOR OF AN ELECTRICAL MACHINE, ELECTRICAL MACHINE AND CONNECTING DEVICE

CROSS-REFERENCE TO RELATED APPLICATIONS

This application is the U.S. National Phase of PCT Application No. PCT/EP2019/061370 filed on May 3, 2019, which claims priority to German Patent Application No. DE 10 2018 207 123.3, filed on May 8, 2018, the disclosures of which are hereby incorporated in their entirety by reference herein.

TECHNICAL FIELD

The present disclosure relates to a stator for use in an electrical machine and an electric machine for use in a motor vehicle.

BACKGROUND

A brushless electric motor in the form of an electrical (three-phase) machine has a stator comprising a stator laminated core with a number of stator teeth which are arranged, for example, in a star shape and carry an electrical rotating field winding in the form of individual stator coils which, for their part, are wound from an insulating wire. The coils are associated with individual strands or phases of the machine and are interconnected to one another in a predetermined manner via connecting conductors of an interconnection device or switching unit.

In the case of a brushless electric motor as the three-phase machine, the stator has three phases and therefore, for example, three phase conductors or phase windings to which electric current is applied in each case with a phase offset in order to generate a magnetic rotating field in which a rotor or rotating part which is usually provided with permanent magnets rotates. The phase ends of the phase windings are guided to a motor electronics system in order to drive the electric motor. The coils of the rotating field winding are interconnected to one another in a specific manner by means of the phase ends via phase connections. The type of interconnection is determined by the winding pattern of the rotating field winding, wherein a conventional winding pattern is a connection of the phase windings in star or a connection of the phase windings in delta.

It is likewise conceivable for the phases of the rotating field winding to be formed from a common, continuous coil or winding wire. Here, instead of two phase or coil ends, in particular the individual winding wire is coupled to the phase connections point-by-point at interconnection points.

SUMMARY

The present disclosure may address one or more objects such as providing an interconnection device for a stator and an electrical machine including such a stator.

According to one or more embodiments, stator for use in an electrical machine or an electric motor for use in an oil pump of a motor vehicle transmission. The stator may include a stator laminated core that may be punch-stacked and include a number of stator teeth that may be arranged in a star shape and may be directed, for example, radially inward. The stator teeth may be provided with a polyphase rotating field winding, and each phase (phase winding) may include at least one coil or coil winding.

The phases of the rotating field winding are formed from a continuously wound winding wire. This means that all of the coils of the rotating field winding are wound from a common, continuous coil, phase or winding wire. In order to form a coil of this kind, the winding wire is wound with a plurality of turns about a respective stator tooth. The phases of the rotating field winding are therefore coupled to one another in one part, that is to say in one piece or monolithically. In other words, the phases of the rotating field winding merge with one another without interruption. The coils of the rotating field winding are therefore designed as multiple coils, the coil winding of which is applied to a plurality of, in particular all of the, stator teeth.

The winding wire may include an electrically conductive core which is provided with an insulating sheath (insulation). In other words, the winding wire is designed as an insulating wire, in particular as an insulated copper wire. The winding wire is interconnected to an interconnection device for the rotating field winding, that is to say is contact-connected or electrically conductively connected to phase connections in the assembled state. To this end, the interconnection device has a number of U-shaped insertion pockets, which number corresponds to the number of phases, as interconnection points of the winding wire to phase connections on a stator end side. The two phase or wire ends of the winding wire may be interconnected or can be interconnected to a phase connection.

Each insertion pocket has two vertical U-limbs with a contact slot, which is arranged between these limbs, for receiving a respective wire section of the winding wire. The winding wire may be inserted into the contact slot in sections and then electrically contacted and mechanically secured by means of the insulation-displacement contact.

According to one or more embodiments, one of the two vertical U-limbs of the insertion pocket is designed to be longer than the respectively other vertical U-limb along an axial direction of the stator. In other words, the vertical U-limbs of the insertion pockets have different lengths to one another along the axial direction.

The winding wire is applied to the stator teeth of the stator laminated core, for example, in a fully automated manner by means of a single-needle or multiple-needle process for forming the phase conductors or coil wires of the rotating field winding. Here, the extended U-limb acts as an (axially) elevated shoulder during the course of the winding process. During winding or laying, the winding wire is guided around the extended U-limb and then pulled downward, that is to say axially in the direction of the stator laminated core, by means of a winding tool of a winding machine. As a result, the winding wire slides on the extended U-limb, and is in this way moved to the desired position within the contact slot.

In other words, it is therefore possible to arrange the winding wire in the contact slot during the course of a winding process without using additional holding devices or the like of the winding machine and/or the interconnection device. As a result, it is possible to wind the stator in one pass, that is to say without interrupting the winding process, with the rotating field winding in a simple manner. As a result, a particularly suitable stator which is improved, in particular, in respect of the expenditure on assembly or winding is realized. In particular, in the case of the stator according to the invention, it is possible to use comparatively simple winding machines for producing the rotating field winding, as a result of which the production of the stator is simplified and consequently production costs are reduced.

Owing to the contacting of the continuous winding wire by means of insulation-displacement contacts which can be inserted into the insertion pockets, the interconnection of the rotating field winding and therefore of the stator is substantially simplified. In particular, making contact with the coils or phases is simplified since an additional insulation-stripping step for the insulated winding wire is not required during assembly and interconnection. As a result, a solder-free connection with a reduced number of tools and electrical contact-connection between the winding wire and the respectively associated phase connection is realized. This consequently advantageously translates into a reduction in the expenditure on assembly when assembling the stator, as a result of which production costs are further reduced. Furthermore, simple and cost-effective contacting and securing of the winding wire are realized.

The or each insulation-displacement contact has, for example, two insulation-displacement limbs, which are spaced apart from one another so as to form an insulation-displacement slot with a free-end-side slot opening, for contacting at least one wire section which is seated in the contact slot of the associated insertion pocket, and the insulation-displacement limbs are seated in receptacles of the vertical U-limbs of the insertion pocket in the assembled or joined state. The contact slot of the insertion pocket and the insulation-displacement slot of the insulation-displacement contact are oriented in a suitably aligned manner in relation to one another here. The slots of the insulation-displacement contact and of the insertion pocket expediently run axially, that is in the axial direction based on the assembly state of the stator.

The insertion pocket is designed, in particular, for receiving at least one wire section of the winding wire. The insulation-displacement contact is inserted, for example, axially into the insertion pocket, and the wire section is permanently contacted in this region. The insulation-displacement slot and/or the insulation-displacement limbs of the insulation-displacement contact may be designed in such a way that the at least one wire section of the winding wire, which wire section is introduced into the insulation-displacement slot and is guided along at least one limb-side blade edge there, is contacted in an operationally safe and reliable manner.

In an advantageous embodiment, the winding wire is guided tangentially, that is to say along the tangential direction or along the circumference of the stator, in relation to the respective insertion pocket, and the U-limb of the insertion pocket, which U-limb is on the front side along the tangential direction, is axially extended. As a result, particularly simple laying and interconnection of the winding wire is realized during the course of a winding process.

Here, the winding wire is guided tangentially in relation to the extended vertical U-limb and wrapped around this limb, that is to say is laid around the U-limb. The extended U-limb therefore acts as a laying aid and as a deflection means during the course of the winding process. In other words, the winding wire is guided around the extended U-limb of the insertion pocket as a wire loop or wire noose. The winding wire is therefore guided, for example, tangentially and radially on the inside toward the extended U-limb and guided tangentially and radially on the outside away from the extended U-limb. The winding wire is then pulled downward, so that it introduced into the contact slot. This ensures that the winding wire is inserted into the contact slots under tension, that is to say under a certain (mechanical) prestress, so that a particularly material-saving rotating field winding which is compact in respect of installation space is realized.

As an example, the free end of the extended U-limb has a chamfer or bevel, which faces the contact slot, as an insertion aid for the winding wire. When the winding wire is laid around the relatively long U-limb and given a subsequent lowering of the winding wire, this winding wire automatically slides from the chamfer into the contact slot. As a result, particularly simple and low-cost laying of the winding wire is realized.

In one or more embodiments, the horizontal U-limb of the insertion pocket is oriented along the tangential direction. Here, the opening direction of the contact slot is oriented along the radial direction, that is to say transversely in relation to the tangential direction. This may provide expedient laying of the winding wire, even under tension. In other words, the winding wire runs normally in relation to the slot plane which is spanned by the contact slot, that is to say along the radial direction, in the contacted region.

The insertion pockets may each be arranged between two stator teeth which are adjacent along the tangential direction. The respective insertion pocket is expediently arranged axially above a circumferential stator yoke of the stator laminated core here.

In an alternative development, the horizontal U-limbs of the insertion pockets are rotated, for example, through 90°, that is to say oriented parallel in relation to or along the radial direction. The opening directions of the contact slots are correspondingly oriented along the tangential direction.

As an example, each insertion pocket may have a radially outer outside contour, that is to say an outside contour which faces the outer circumference of the stator or of the stator laminated core, as a supporting contour which projects radially from the insertion pocket. In a suitable development, the supporting contour has a wire guide which runs in a curved manner and by means of which the winding wire is changed over from an axial to a tangential profile from a base of the contact slot. The supporting contour therefore acts as a termination to the radially outer, tangential guiding of the winding wire at the insertion pocket. This may provide an effective and low-cost winding process.

In one or more embodiments, the supporting contour is integrally formed on the axially extended U-limb of the insertion pocket. In other words, the supporting contour is designed as a radially outer widened portion of the U-limb of the insertion pocket. This renders possible particularly expedient guiding of the winding wire.

The refinement of the insertion pocket with an above-described supporting contour is considered to be an independent invention.

As an example, a corresponding stator of an electrical machine, in particular electric motor of a motor vehicle, is also considered to be an independent invention. A stator of this kind has a stator laminated core which has a number of stator teeth and is provided with a rotating field winding which is arranged on the stator teeth and may include a plurality of phases, and the phases of the rotating field winding are formed from a continuously wound winding wire. A stator of this kind further has an interconnection device with a number of U-shaped insertion pockets, which number corresponds to the number of phases, for receiving in each case one insulation-displacement contact as an interconnection point of the winding wire with phase connections on a stator end side. Here, each of the insertion pockets has two vertical U-limbs and one contact slot, which is arranged between these limbs, for receiving the winding wire, and an above-described outside or supporting contour is integrally formed on the insertion pocket.

An additional or further aspect of the present disclosure makes provision for the interconnection device to have two laying rings which are axially mounted on the opposite end sides of the stator laminated core. Here, the laying rings are may be insulating, that is to say electrically non-conductive, plastic parts. The laying rings each have a number of radially inwardly directed half-sleeve-like coil formers, which number corresponds number of stator teeth, and the coils of the rotating field winding are wound around the coil formers. In other words, the coil windings which form the coils, that is to say the winding wire, are each wound around a coil carrier, which engages around the respective stator teeth, of the laying rings which are arranged opposite. The coil carrier may include end-side flange collars, that is flange collars which are directed perpendicularly in relation to the longitudinal direction of the teeth, between which the available winding space is limited. The coil carrier therefore prevents the rotating field winding from sliding down from the teeth of the stator.

As an example, the insertion pockets are integrally formed in one piece on one of the laying rings which is also referred to as the interconnection ring below. The insertion pockets and the laying or interconnection ring may be produced as a common injection-molded part. This may provide cost-effective production of the interconnection device with reduced expenditure.

In one or more embodiments, the stator is part of an electrical machine, such as an electric motor of a motor vehicle. Here, the electric motor may be formed as an electromotive drive of an electric oil pump, for example for a motor vehicle transmission. Owing to the use of a stator according to the invention, a particularly expedient and cost-effective machine is realized.

Oil pumps of this kind and may be referred to as auxiliary or additional pumps serve for conveying oil as lubricant for, in particular, moving parts or components, for example, also of a vehicle (motor vehicle) which is driven by an internal combustion engine, a hybrid drive or electrically. An oil pump of this kind usually produces, on account of its conveying properties, an oil circuit, for example having an oil sump for receiving excess oil and/or leaking oil. A electrically or electromotively driven auxiliary or additional pump frequently serves for at least temporarily lubricating or additionally lubricating transmission parts of a vehicle transmission, such as for an automatic transmission. Here, the conveyed oil frequently also serves for cooling components or additional components of the drive train of a vehicle of this kind.

The interconnection device according to one or more embodiments, may be for use in a stator of an electrical machine. Here, the stator may form a rotating field winding with a number of phases, and each phase may include at least one coil, and the phases of the rotating field winding are formed from a continuously wound winding wire. Here, the interconnection device has a number of U-shaped insertion pockets, which number corresponds to the number of phases, for receiving in each case one insulation-displacement contact for contact-connecting the winding wire to phase connections on a stator end side. The or each insertion pocket is designed with two vertical U-limbs and with one contact slot, which is arranged between these limbs, for receiving the winding wire at least in sections. According to another embodiment, one of the two vertical U-limbs of the insertion pocket is designed to be longer than the respectively other vertical U-limb along an axial direction.

The interconnection device is suitable and designed, in particular, for contacting an electric motor of an electric oil pump for applications in the motor vehicle and automotive sector.

BRIEF DESCRIPTION OF THE DRAWINGS

An exemplary embodiment of the invention is explained in more detail below with reference to a drawing, in which.

Parts and sizes which correspond to one another are always provided with the same reference signs throughout the figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The interconnection of the rotating field winding or the winding wire can be performed by means of insulation-displacement contacts. To this end, that wire section of the winding wire with which contact is to be made is pushed into a sleeve-like insertion pocket and mechanically secured to a metal insulation-displacement contact (clamping plug), which can be inserted into the insertion pocket, within the insertion pocket. The insulation-displacement contact typically has at least one cutting edge which, when it is inserted into the insertion pocket, severs the insulation of the insulating wire of the winding wire in such a way that, with an insulation-displacement contact inserted, a core of the winding wire is electrically conductively coupled to the insulation-displacement contact. In the assembled state, the insulation-displacement contacts are contact-connected to the motor electronics system for energizing the phases via the phase connections.

Particularly in the case of rotating field windings which are wound from a single continuous winding wire, the problem arises here of the winding tool typically being wider than the clear width of the contact slot. As a result, it is not readily possible to lay the winding wire in the insertion pocket of the respective insulation-displacement contacts without collision. Therefore, it is necessary in this case, for example, for the winding tool or the winding machine to be provided with additional holding devices for the insertion of the winding wire into the insertion pocket. As a result, the production of a one-part or one-piece rotating field winding of this kind is comparatively complicated and costly.

Figure 1:
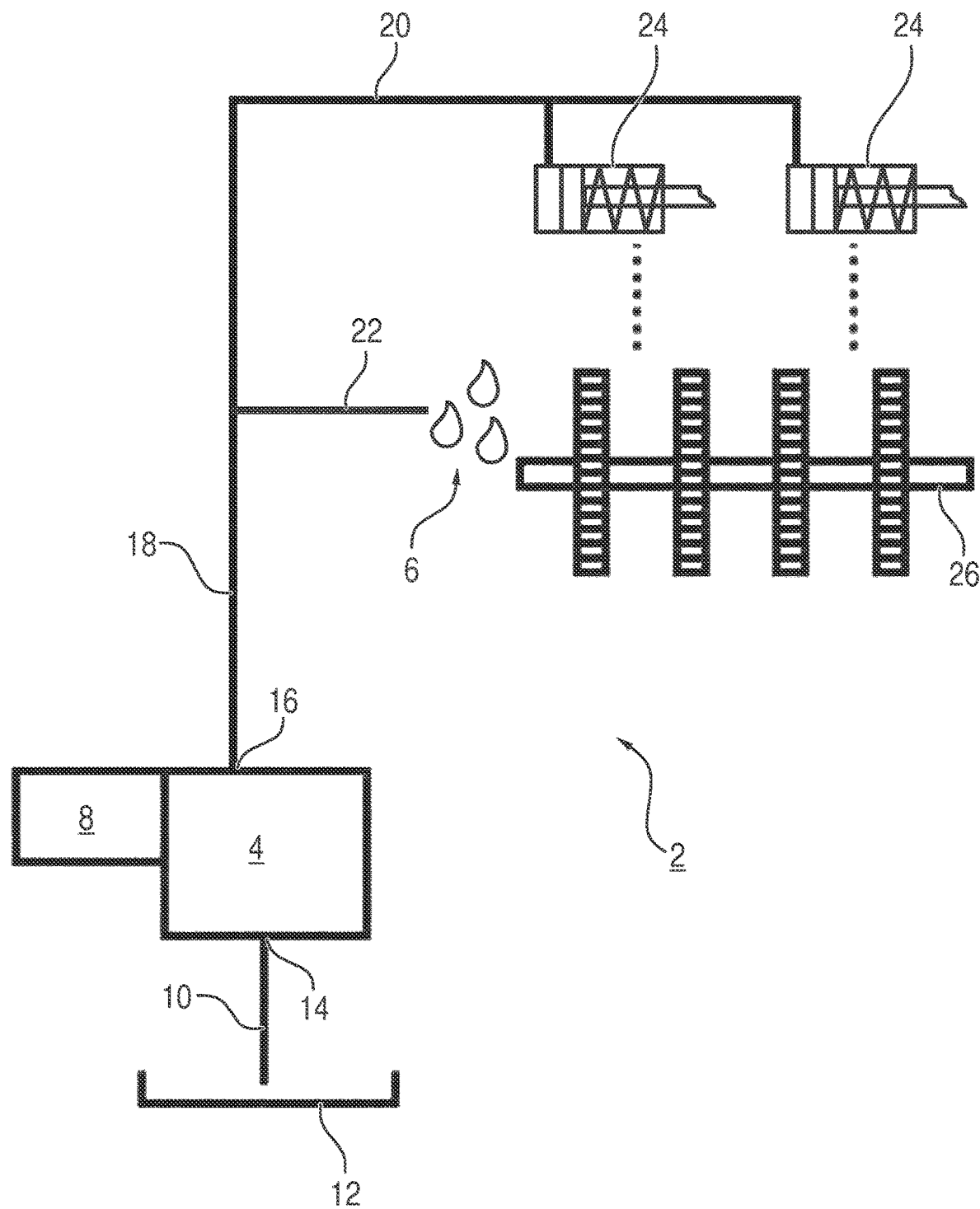
FIG. 1 shows a schematic and simplified illustration of an oil circuit of a motor vehicle comprising an electromotive oil pump.

FIG. 1 shows a schematic and simplified illustration of a subregion of an oil circuit 2 of a motor vehicle, not illustrated in any detail. The oil circuit 2 may include an electrical or electromotive pump 4 as a combined main oil pump and auxiliary or additional pump for conveying a fluid 6, in particular a (lubricating) oil, to transmission parts of a vehicle transmission.

The pump 4, also referred to below as the oil pump, has an electric motor 8 as the electrical machine. During operation of the machine 8 or the pump 4, the oil 6 is drawn by suction by means of a negative-pressure line 10 from an oil sump 12 via a (pump) inlet 14 and pumped into an oil line 18, which is subdivided into a main oil line 20 and into an auxiliary or additional line 22, via a (pump) outlet 16.

The main oil line 20 forms a main oil circuit of the oil circuit 2 and is provided, in particular, for supplying and operating hydraulic transmission actuators 24 by way of which, for example, the gears of a transmission arrangement 26 of a vehicle transmission, which may be designed as an automatic transmission or double-clutch transmission, are selected or shifted. The auxiliary or additional line 22 is accordingly, in particular, part of an auxiliary or additional circuit for at least temporarily lubricating or additionally lubricating transmission parts such as, for example, the transmission arrangement 26.

Figure 2:
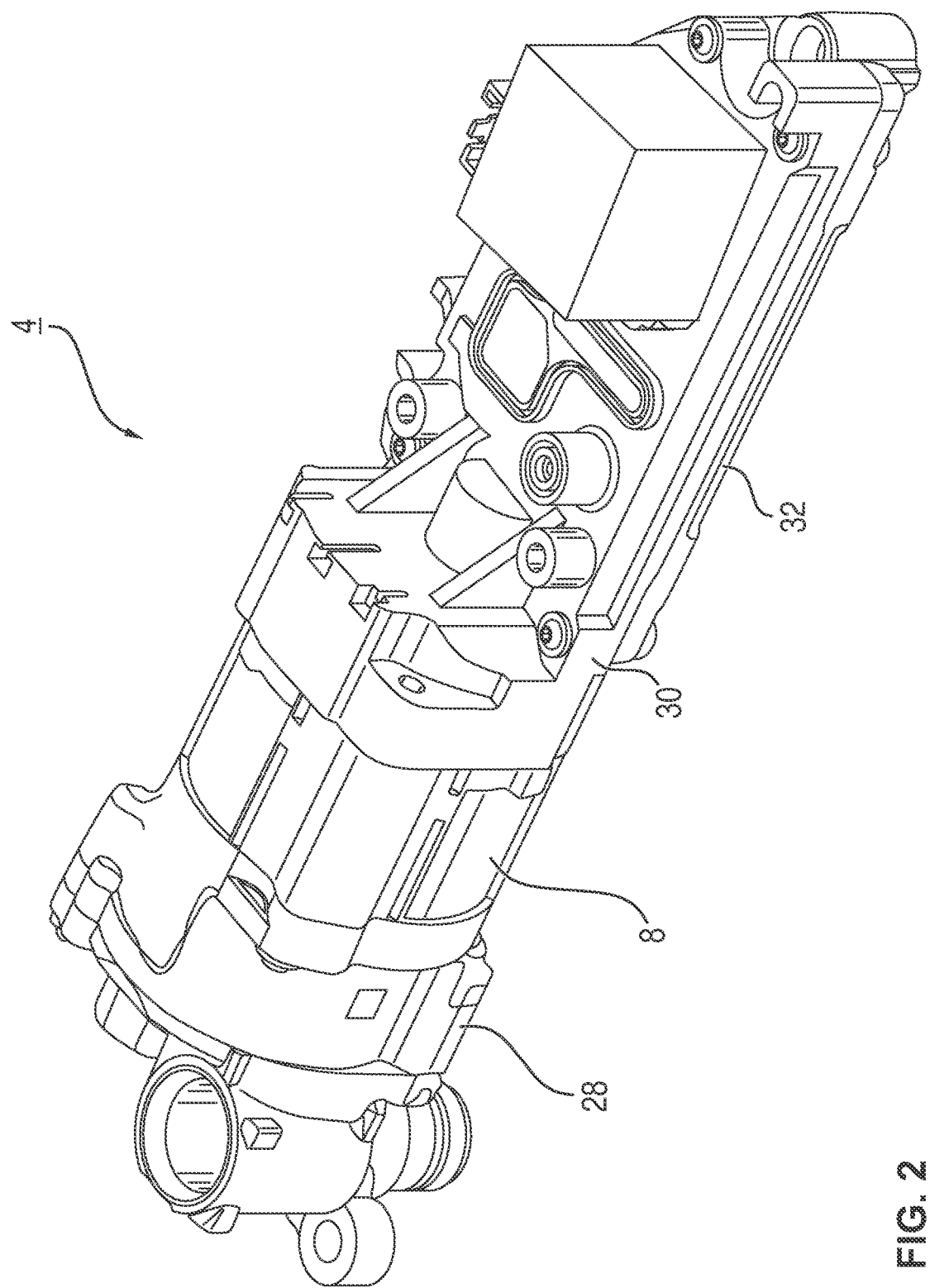
FIG. 2 shows a perspective illustration of the oil pump comprising an electric motor.

The oil pump 4 is shown in a comparatively detailed manner in FIG. 2. The oil pump 4 may include a pump housing 28 with a pump mechanism, not shown in any detail, for conveying the oil 6. The pump mechanism is drive-coupled to the machine 8. To this end, the machine 8 is fastened, at a first end side, to the pump housing 28. A function carrier 30 which carries a (motor) electronics system for operating the machine 8 is provided at that end side of the machine 8 which is situated opposite the pump housing 28. In order to remove heat from and protect the electronics system, said electronics system is covered in a fluid-tight manner by means of a cooling structure 32. In other words, the function carrier 30 and the cooling structure 32 form a closed electronics housing of the oil pump 4.

Figure 3:
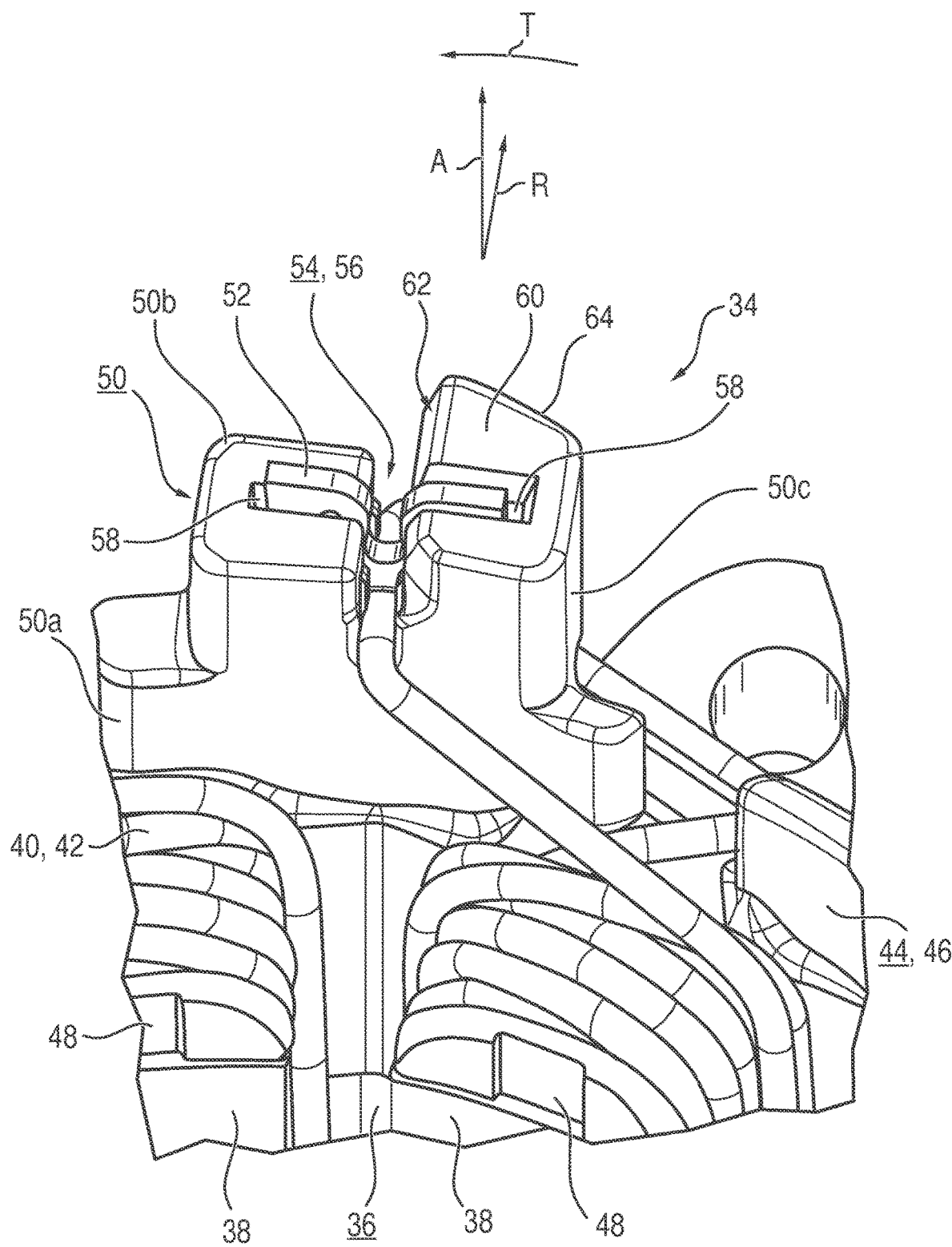
FIGS. 3 and 4 show perspective illustrations of details of a stator of the electric motor comprising a rotating field winding and comprising an interconnection device with an insulation-displacement contact and with an insertion pocket looking at a radial inner side of the insertion pocket.
Figure 4:
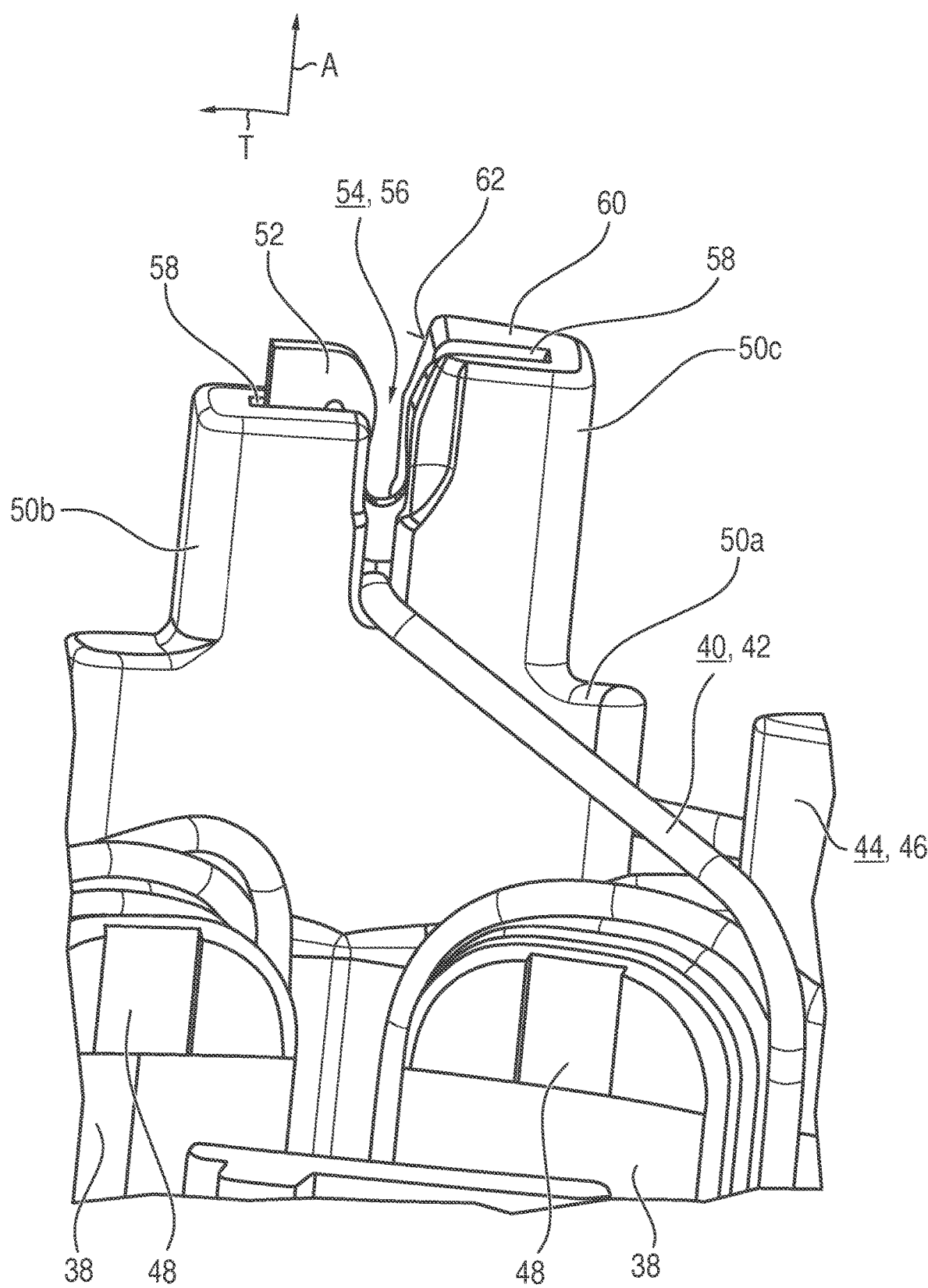
Figure 5:
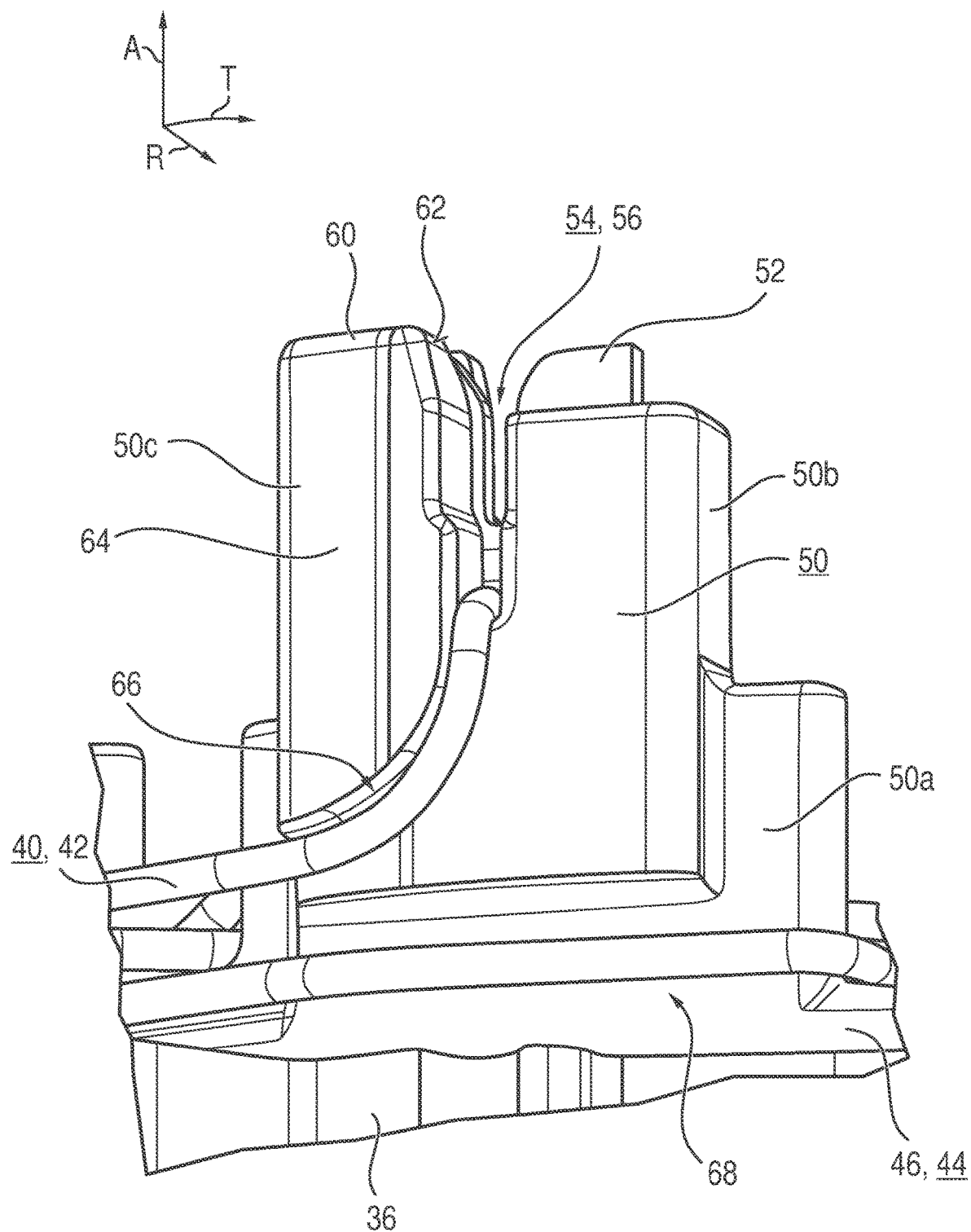
FIG. 5 shows a perspective illustration of a detail of the stator looking at a radial outer side of the insertion pocket.

FIGS. 3 to 5 show details of a stator 34 of the machine 8. The stator 34 has a punch-stacked stator laminated core 36. The stator laminated core 36 has a number of radially inwardly directed stator teeth 38 which carry a, for example, three-phase rotating field winding 40.

Directional information, in particular with respect to the assembly state of the approximately cylindrical stator 34, is specified below. Here, the axial direction A is oriented along the longitudinal direction or central axis of the stator 34. The radial direction R extends from the central axis to an outer circumference of the stator 34. The tangential or azimuthal direction T is perpendicular to the axial direction A and the radial direction R, and therefore oriented along the outer circumference of the stator 34.

The phases of the rotating field winding 40 are wound from a continuously, that is to say interruption-free, winding wire 42 which is wound as a multiple coil onto the stator teeth 38. In this exemplary embodiment, the winding wire 42 is applied to the stator laminated core 36 or to the stator teeth 38 in a single-needle winding process in particular. Here, the winding wire 42 is wound around the stator teeth 38 in the form of coils in the region of said stator teeth and otherwise guided, in particular, tangentially along an outer circumference of the stator 34 or the stator laminated core 36.

The stator 34 has an interconnection device 44 for guiding and interconnecting the winding wire 42. The interconnection device 44 has two laying rings 46 which are axially mounted on the stator laminated core 36 at the opposite end sides of said stator laminated core. Only one of the laying rings 46 is illustrated in each of the details of FIGS. 3 to 9.

The laying rings 46 each have a number of radially inwardly directed half-sleeve-like coil formers 48, which number corresponds to number of stator teeth 38, and the winding wire 42 of the rotating field winding 40 are wound around the coil formers 48.

The illustrated laying ring 46, which faces the function carrier 30, further has a number of U-shaped insertion pockets 50, which number corresponds to the number of phases of the rotating field winding 40. Here, the insertion pockets 50 are designed for receiving in each case one insulation-displacement contact (clamping plug) 52. Here, the insertion pockets 50 are integrally formed in one part, that is to say in one piece or monolithically, on the laying ring 46.

The inserted insulation-displacement contacts 52 act as a respective interconnection point of the winding wire 42 to phase connections on the stator end side which faces the function carrier 30. To this end, the insulation-displacement contacts 52 have an approximately U-shaped cutout 54 into which the respective phase connection engages in a contact-making manner in the assembled state.

The approximately U-shaped, sleeve-like insertion pocket 50 is suitable and designed for receiving and contacting a respective wire section of the winding wire 42 here. Here, the horizontal U-limb (horizontal limb) 50a of the insertion pocket 50 is oriented along the tangential direction T, and the two vertical U-limbs (vertical limbs) 50b and 50c which are arranged perpendicularly in relation to said tangential direction are oriented along the axial direction A. An elongate contact slot 56, in which the winding wire 42 is seated, is provided in the middle or centrally between the U-limbs 50b and 50c. The contact slot 56 therefore runs along the axial direction A, and the contact slot 56 is open along the radial direction R.

The vertical U-limbs 50b and 50c of the insertion pocket 50 each have a groove-like receiving chamber 58 which is open in the direction of the central contact slot 56. The metal insulation-displacement contact 52 is inserted or can be inserted into the receiving chambers 58—as indicated in FIGS. 3 to 5.

The insulation-displacement contact 52 has an approximately U-shaped cutting edge which faces the insertion pocket 50. When the insulation-displacement contact 52 is inserted, the winding wire 42 of the rotating field winding 40, which winding wire is designed as an insulating wire, is firstly pressed or pinched in an interlocking and force-fitting manner into the contact slot 56, the secondly the cutting edge cuts through or at least severs the insulations of the insulating wire. As a result, an electrically conductive core of the winding wire 42 is electrically conductively contact-connected to the insulation-displacement contact 52, and the insulation-displacement contact 52 in turn is contact-connected to the phase connections, not illustrated in any detail, for energizing the rotating field winding 40 via the cutout 54 in the assembled state.

As is comparatively clearly shown in FIGS. 3 to 9, the vertical U-limb 50c of the insertion pocket 50 is designed to be longer than the vertical U-limb 50b along the axial direction A. In other words, a free end 60 of the U-limb 50c projects beyond the corresponding free end of the U-limb 50b along the axial direction A.

The winding wire 42 is guided tangentially, that is to say along the tangential direction T or along the circumference of the stator 34, in relation to the respective insertion pocket 50, and the U-limb 50c of the insertion pocket 50, which U-limb is on the front side along the tangential direction T, is axially extended.

The free end 60 of the extended U-limb 50c—as shown in FIG. 4 in particular—is designed with a chamfer or bevel 62, which faces the contact slot 56, as an insertion aid for the winding wire 42.

As shown in FIG. 5 in particular, the U-limb 50c is provided with a supporting contour 64 which is on the outside of the circumference, that is to say is radially on the outside, and faces the outer circumference of the stator 34 or of the stator laminated core 36. Here, the supporting contour 64 projects radially from the insertion pocket 50 or the U-limb 50c. The supporting contour 64 is, as shown in FIG. 3 for example, designed as a radial thickened portion or shoulder of the U-limb 50c.

The supporting contour 64 has approximately a cross-sectional shape of a right-angled triangle in a plane which is spanned by the radial direction R and tangential direction T. Here, the catheti are oriented firstly along the radial direction R and secondly the tangential direction R, and the hypotenuse is inclined, starting from the contact slot 56, in such a way that the U-limb 50a is increasingly radially tapered along the tangential direction T starting from the contact slot 56.

The supporting contour 64 has a curved profile 66 starting from a base of the contact slot 56. The winding wire 42, starting from the base of the contact slot 56, is changed over from an axial to a tangential profile by means of the profile 66 which is also referred to as the wire guide below. Here, the wire section of the winding wire 42, which wire section is guided radially in the contact slot 56, is axially bent and guided so as to run along the wire guide 66, so that the winding wire 42 runs along the tangential direction T at the end of the wire guide 66. The supporting contour 64 therefore acts as a termination to the radially outer and tangential guide of the winding wire 42 at the insertion pocket 50.

The refinement of the insertion pocket 50 with an above-described supporting contour 64 is considered to be an independent invention.

The insertion pockets 50 of the laying ring 46 have an additional termination 68 which is integrally formed on the U-limb 50a as a groove-like cutout. The termination 68 serves for circumferentially or tangentially guiding the winding wire 42 behind the stator teeth 38 from stator tooth 38 to stator tooth 38, so that the corresponding wire section of the winding wire 42 does not collide with the wire section which is guided on the supporting contour 64 or a wire guide 66.

The winding process for fitting the rotating field winding 40 on the stator laminated core 36 is explained in more detail below with reference to FIGS. 6 to 9. The arrows in FIGS. 6 to 9 indicate the profile of the winding wire 42 during the course of the winding process.

The winding wire 42 is applied to the coil formers 48 of the stator teeth 38 of the stator laminated core 36 in a fully automated manner by means of a single-needle process for forming the phase conductors or coil wires of the rotating field winding 40. Here, the extended U-limb 50c acts as an (axially) elevated and (radially) widened shoulder during the course of the winding process.

Figure 6:
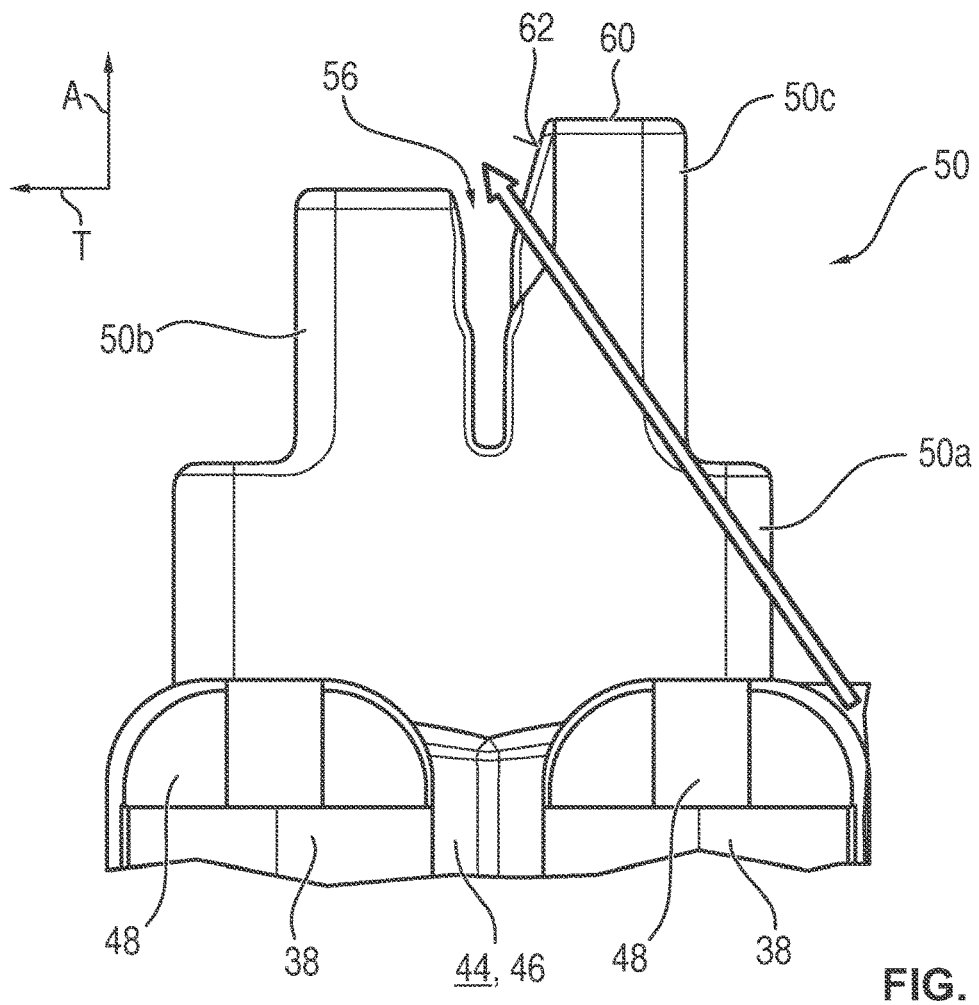
FIG. 6 shows a front view of the insertion pocket looking at the radial inner side during a winding process in which a winding wire is placed around a U-limb of the insertion pocket.
Figure 7:
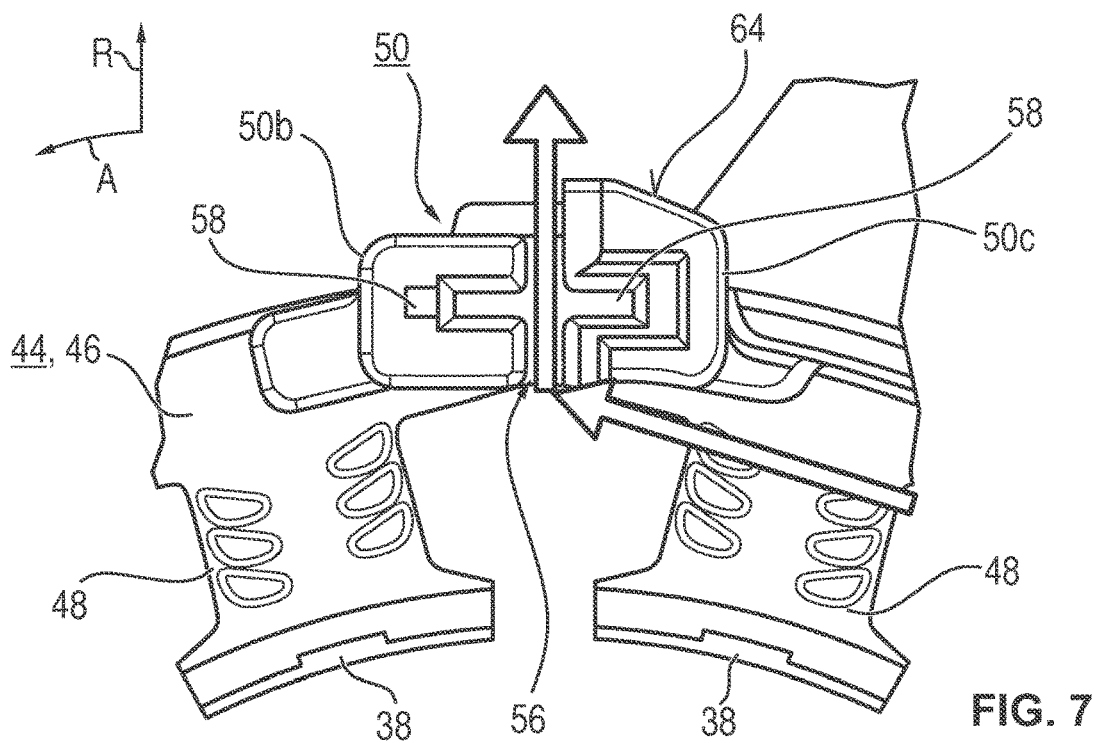
FIG. 7 shows a plan view of the insertion pocket during a winding process.

During winding, the winding wire 42 is guided from a wire section, which is designed as a coil winding, tangentially and radially on the inside to the extended U-limb 50c by means of a winding tool of a winding machine—as indicated in FIG. 6 and FIG. 7. Here, the winding tool is designed to be wider than the contact slot 56, so that the winding wire 42 is guided firstly above the free end of the U-limb 50b and secondly below the free end 60 of the U-limb 50c without collision. In other words, the winding wire 42 is applied to the U-limb 50c in the region of the chamfer 62.

Figure 8:
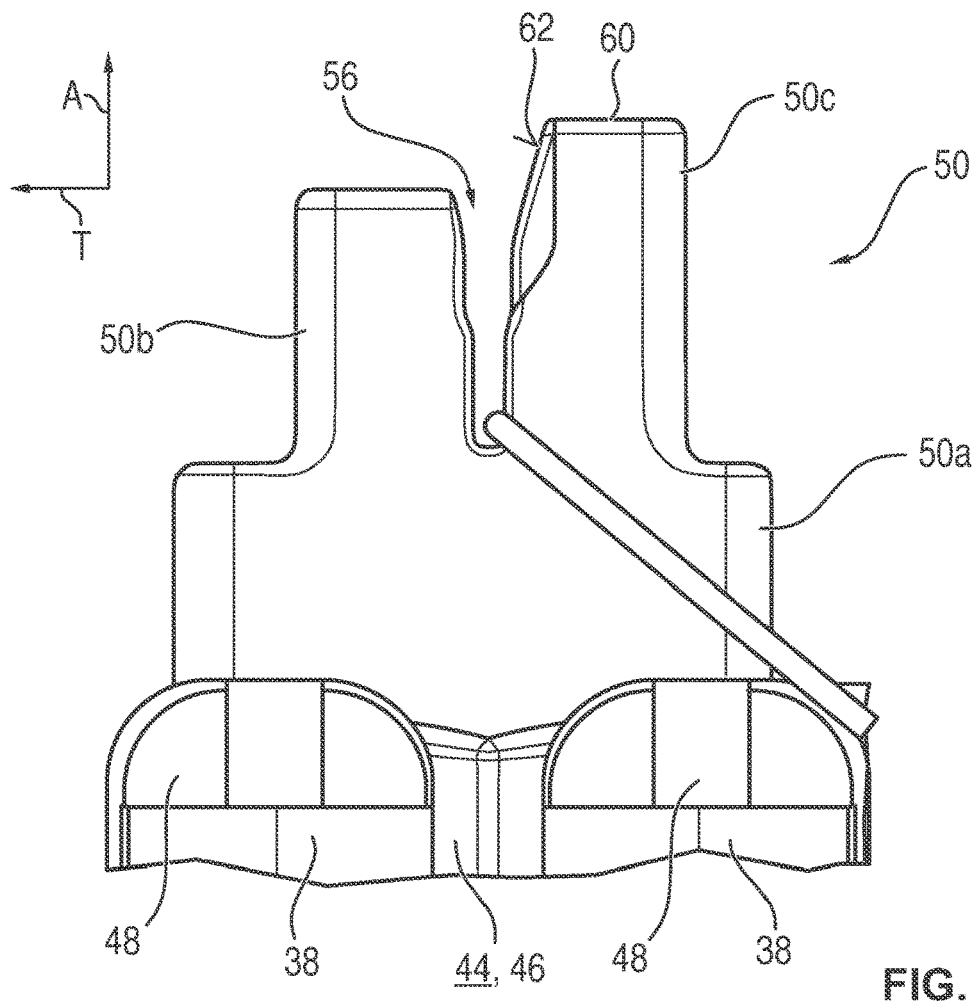
FIG. 8 shows a front view of the insertion pocket looking at the radial inner side as the winding wire slides into a contact slot of the insertion pocket.
Figure 9:
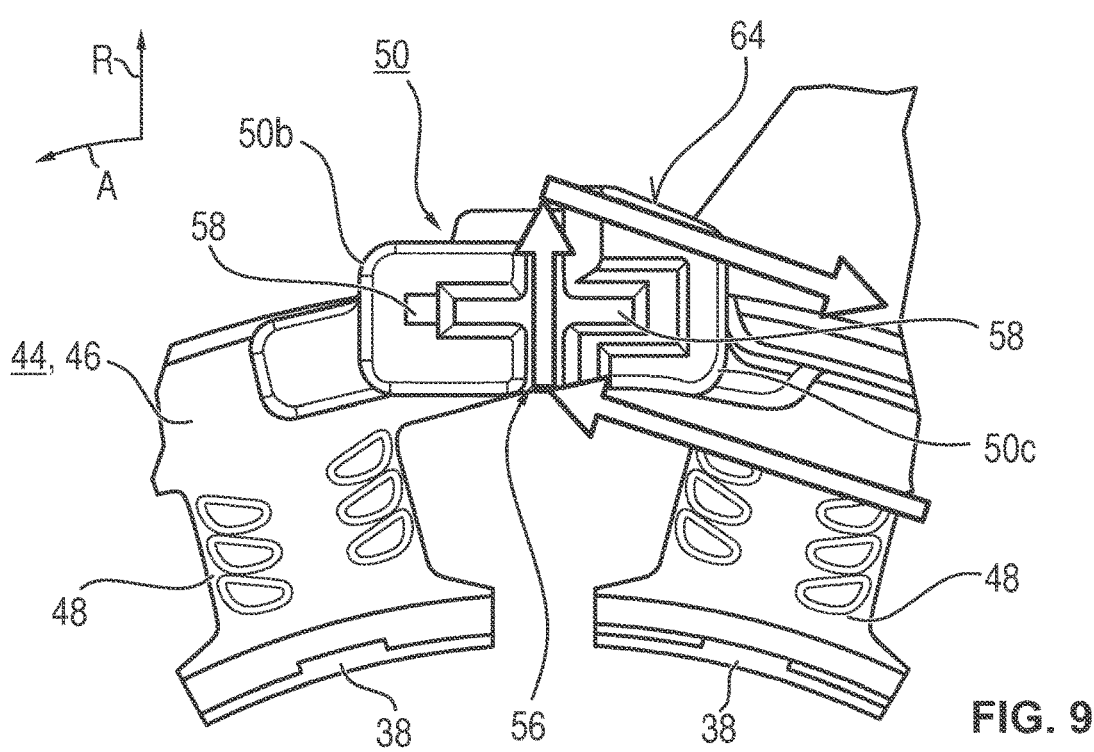
FIG. 9 shows a plan view of the insertion pocket as the winding wire slides into a contact slot of the insertion pocket.

The winding wire 42 is then—as indicated in FIGS. 8 and 9—laid or wound in such a way that it runs on the wire guide 66 of the supporting contour 64. As a result, the winding wire 42 is lowered, that is to say moves axially downward. Here, the wire section on the chamfer 62 slides along the axial direction A and is therefore drawn into the contact slot 56. As a result, the winding wire 42 is guided in the insertion pocket 50, in particular the winding wire 42 is placed on the base of the contact slot 56 here.

The extended U-limb 50c therefore acts as a laying aid and as a deflection means during the course of the winding process. In other words, the winding wire 42 is guided around the extended U-limb 50c of the insertion pocket 50 as a wire loop or wire noose.

Therefore, it is possible to arrange the winding wire 42 in the contact slot 56 during the course of a winding process without using additional holding devices or the like of the winding machine. As a result, it is possible to wind the stator 34 in one pass, that is to say without interrupting the winding process, with the rotating field winding 40.

The invention is not limited to the exemplary embodiments described above. On the contrary, it is also possible for other variants of the invention to be derived from said exemplary embodiments by a person skilled in the art without departing from the subject matter of the invention. In particular, all individual features described in connection with the exemplary embodiments can furthermore also be combined with one another in a different way without departing from the subject matter of the invention.

In particular, it is possible for the rotating field winding 40 to have more than three phases, and a correspondingly large number of insertion pockets 50 and insulation-displacement contacts 52 are provided for interconnection.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS

2 Oil circuit
4 Oil pump
6 Fluid/oil
8 Electric motor/machine
10 Negative-pressure line
12 Oil sump 14 Inlet
16 Outlet
18 Oil line
20 Main oil line
22 Auxiliary line/additional line
24 Transmission actuator
26 Transmission arrangement
28 Pump housing
30 Function carrier
32 Cooling structure
34 Stator
36 Stator laminated core
38 Stator tooth
40 Rotating field winding
42 Winding wire
44 Interconnection device
46 Laying ring
48 Coil former
50 Insertion pocket
50$a$, 50$b$, 50$c$ U-limb
52 Insulation-displacement contact
54 Cutout
56 Contact slot
58 Receiving chamber
60 Free end
62 Chamfer/bevel
64 Supporting contour
66 Profile/wire guide
68 Termination
A Axial direction
R Radial direction
T Tangential direction While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A stator for use in an electrical machine, the stator comprising:
   a stator laminated core including a number of stator teeth and a winding wire, wherein the winding wire is continuously wound and forms a number of rotating field windings each arranged on each of the stator teeth to form a number of phases and a portion of the winding wire extends in a tangential direction with respect to a U-shaped insertion pocket of a number of U-shaped insertion pockets; and
   an interconnection device provided with the number of U-shaped insertion pockets corresponding to the number of phases, and each of the U-shaped insertion pockets receive an insulation-displacement contact to form an interconnection point between the winding wire and a number of phase connections disposed on a stator end side and include,
   a first vertical U-limb and a second vertical U-limb each extending in an axial direction and collectively defining a contact slot disposed between the first vertical U-limb and the second vertical U-limb, wherein the first vertical U-limb is longer than the second vertical U-limb and the first vertical U-limb is disposed forward of the second vertical U-limb with respect to the tangential direction.

2. The stator of claim 1, wherein a free end of the first vertical U-limb includes a chamfer and the chamfer faces the contact slot.

3. The stator of claim 1, wherein a U-shaped insertion pocket of the number of U-shaped insertion pockets includes a horizontal U-limb oriented along the tangential direction.

4. The stator of claim 3, wherein a radially outward portion of the insertion pocket includes supporting contour.

5. The stator of claim 4, wherein the supporting contour defines a wire guide, wherein the wire guide is curved and a portion the winding wire lies against the wire guide includes a first portion, lying against a base of the contact slot, and a second portion spaced apart from the contact slot, wherein the second portion extends along the tangential direction and the first portion extends in the axial direction.

6. The stator of claim 4, wherein the supporting contour is integrally formed to the first vertical U-limb.

7. The stator of claim 4, wherein the supporting contour includes a first edge and a second edge, wherein the second edge is spaced apart from the contact slot and the first edge defines a portion of the contact slot, and wherein a first portion of the first edge is curved.

8. The stator of claim 7, wherein a second portion of the first edge is tapered with respect to the tangential direction.

9. The stator of claim 3, wherein the contact slot extends radially.

10. The stator of claim 1, wherein the first vertical U-limb defines a first opening and the second vertical U-limb defines a second opening, wherein the second opening opposes the first opening.

11. The stator of claim 10, wherein the insulation displacement contact is disposed in the first opening.

12. The stator of claim 1, wherein a first U-shaped insertion pocket of the number of insertion pockets includes a horizontal U-limb and wherein the first vertical U-limb and the second vertical U-limb each extend from the horizontal U-limb.

13. The stator of claim 12, wherein the first vertical U-limb has a first radial width and the second vertical U-limb has a second radial width, the first radial width is greater than the second radial width.

14. A stator for use in a transmission oil pump, the stator comprising:
   a stator laminated core including a number of stator teeth and a winding wire, wherein the winding wire is continuously wound and forms a number of rotating field windings each arranged on each of the stator teeth to form a number of phases and a portion of the winding wire extends in a tangential direction with respect to a U-shaped insertion pocket of a number of U-shaped insertion pockets; and
   an interconnection device provided with the number of U-shaped insertion pockets corresponding to the number of phases, and each of the U-shaped insertion pockets receive an insulation-displacement contact to form an interconnection point between the winding wire and a number of phase connections disposed on a stator end side and include,
   a first vertical U-limb and a second vertical U-limb each extending in an axial direction and collectively defining a contact slot disposed between the first vertical U-limb and the second vertical U-limb, wherein the first vertical U-limb is longer than the second vertical U-limb and the first vertical U-limb is disposed forward of the second vertical U-limb with respect to the tangential direction.

15. The stator of claim 14, wherein the first vertical U-limb defines a first opening and the second vertical U-limb defines a second opening, wherein the second opening opposes the first opening.

16. An interconnection device for use in a stator of an electrical machine, the interconnection device comprising:
- a winding wire, wherein the winding wire is continuously wound to form a number of rotating field windings and a number of phases and a portion of the winding wire extends in a tangential direction with respect to a U-shaped insertion pocket of a number of U-shaped insertion pockets; and
- a number of U-shaped insertion pockets corresponding to the number of phases, wherein each of the U-shaped insertion pockets receive an insulation-displacement contact and form an interconnection point for the winding wire and a phase connection disposed on a stator end side,
- A wherein each U-shaped insertion pocket includes a first vertical U-limb and a second vertical U-limb extending axially and collectively defining a contact slot disposed between the first vertical U-limb and the second vertical U-limb, wherein the contact slot receives a portion of the winding wire, and the first vertical U-limb has a first axial length and the second vertical U-limb has a second axial length, wherein the second axial length is less than the first axial length and the first vertical U-limb is disposed forward of the second vertical U-limb with respect to the tangential direction.

* * * * *